Sept. 1, 1959  F. B. BORDEN  2,902,066
INVERTED RADIAL SAW JIG
Filed July 31, 1957  2 Sheets-Sheet 1
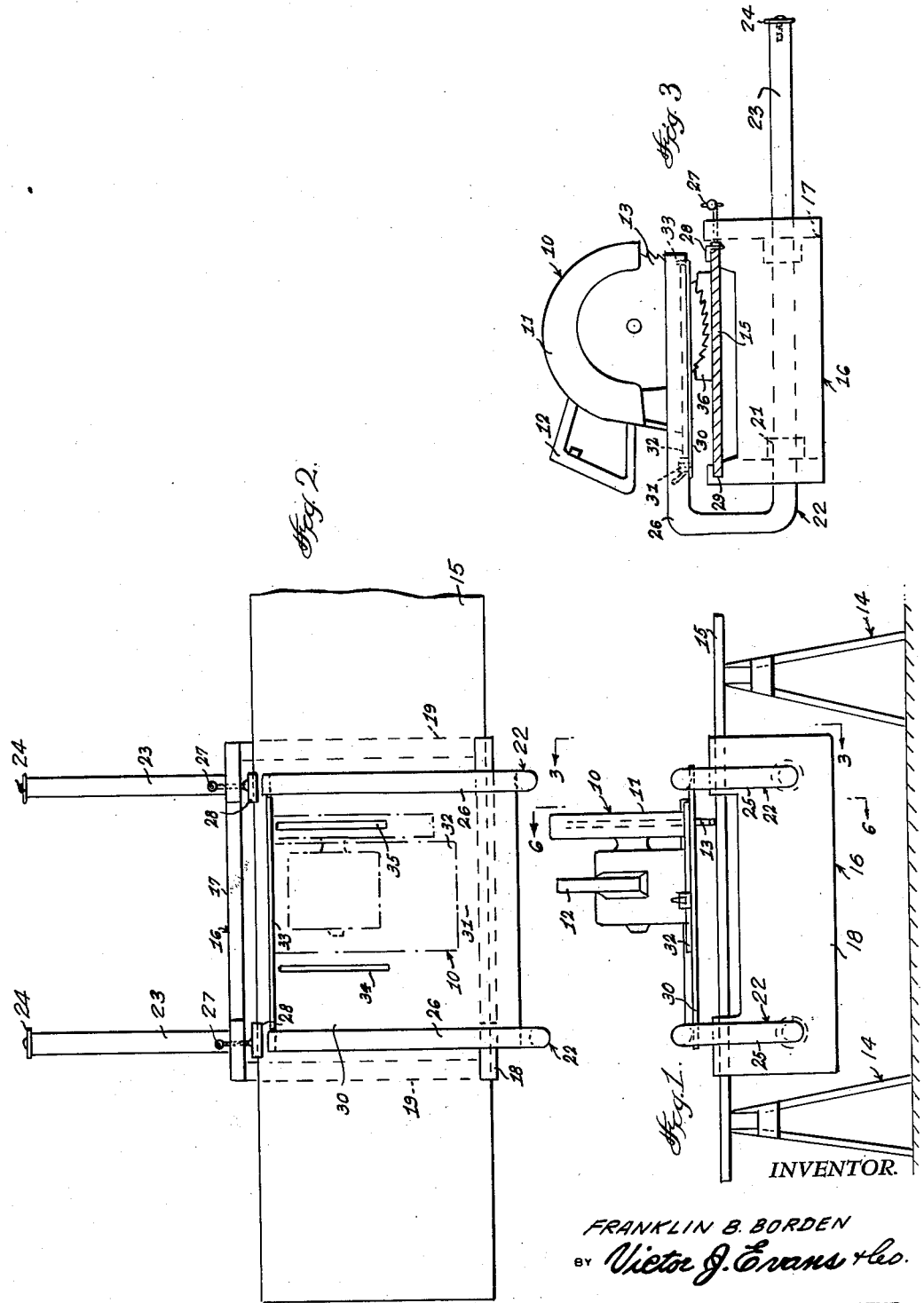
INVENTOR.
FRANKLIN B. BORDEN
BY *Victor J. Evans & Co.*
ATTORNEYS

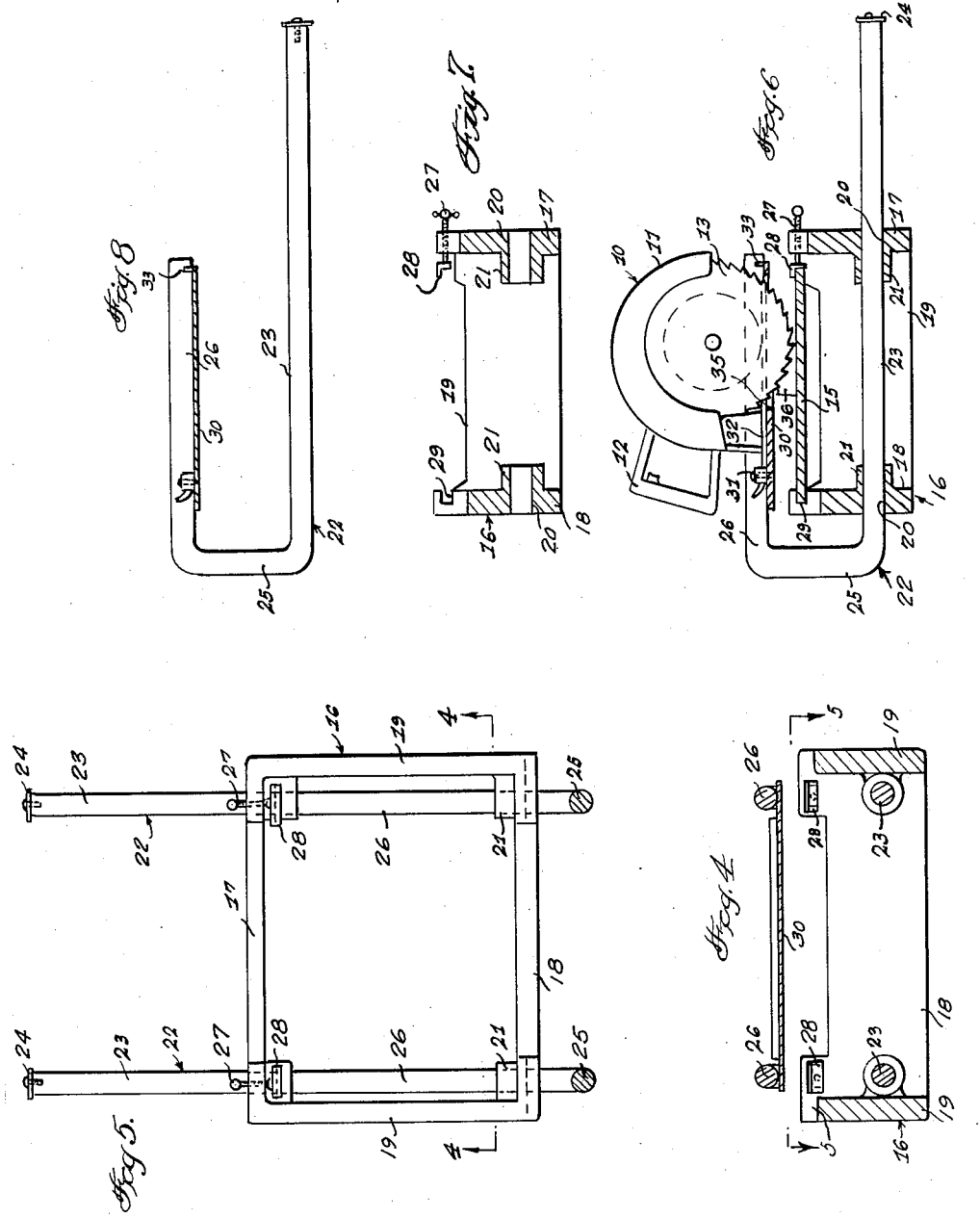

United States Patent Office 2,902,066
Patented Sept. 1, 1959

2,902,066

INVERTED RADIAL SAW JIG

Franklin B. Borden, Bradenton, Fla.

Application July 31, 1957, Serial No. 675,394

3 Claims. (Cl. 143—47)

This invention relates to a saw jig, and more particularly to a saw jig for a portable electric saw.

The object of the invention is to provide an inverted radial saw jig which is adapted to be used with portable electric hand saws wherein the saw is held firmly in place when desired, and wherein the saw can be readily detached from or attached to the jig whenever desired or required.

A further object of the invention is to provide an inverted radial saw jig which is adapted to be used in a manner that is safe since when the saw is used, the saw is moved away from the operator and wherein the saw blade is well shielded from the user, and wherein the setup can be readily moved from place to place as desired.

A further object of the invention is to provide an inverted radial saw jig which is extremely simple and inexpensive to manufacture.

Other objects and advantages will be apparent during the course of the following description.

In the accompanying drawings, forming a part of this application, and in which like numerals are used to designate like parts throughout the same.

Figure 1 is a rear elevational view illustrating the inverted radial saw jig of the present invention being used.

Figure 2 is a plan view of the assembly shown in Figure 1.

Figure 3 is a sectional view taken on the line 3—3 of Figure 1.

Figure 4 is a sectional view taken on the line 4—4 of Figure 5.

Figure 5 is a sectional view taken on the line 5—5 of Figure 4.

Figure 6 is a sectional view taken on the line 6—6 of Figure 1.

Figure 7 is a fragmentary sectional view illustrating the box frame.

Figure 8 is a sectional view showing the platform and one of the body members.

Referring in detail to the drawings, the numeral 10 indicates a conventional portable electric saw which includes the usual housing 11 and handle 12, and the numeral 13 indicates the saw blade.

The present invention is directed to a jig and the jig or setup of the present invention includes a pair of spaced apart support members 14 which may consist of sawhorses, Figure 1. Extending between the pair of support members 14 and supported thereby is a horizontally disposed plank 15. The numeral 16 indicates a rectangular box frame which includes spaced parallel vertically disposed front and rear walls 17 and 18, and the frame 16 further includes spaced parallel vertically disposed side walls 19.

There is provided in the front and rear walls 17 and 18 of the frame 16, opposed openings 20, and guide bosses 21 extend from the front and rear walls and are arranged adjacent the openings 20. There is further provided a pair of movable body members which are each indicated generally by the numeral 22, Figure 6, and each body member 22 includes a horizontally disposed first portion 23 which is slidably mounted in the openings 20 and bosses 21. Stop members 24 are connected to an end of the portion 23 so as to provide a means for limiting sliding movement of the body members 22 in one direction. Each body member 22 further includes a vertically disposed second portion 25 which extends upwardly from an end of the first portion 23, and the second portion 25 terminates in a horizontally disposed third portion 26. As shown in Figure 6 for example, it will be seen that the third portions 26 are shorter than the first portions 23. The portions 23 are arranged below the plank 15, while the portions 26 are arranged above the plank 15.

Adjustably mounted in the front wall 17 of the frame 16 are screw members 27, and the screw members 27 carry clamps 28 which are adapted to engage the front edge of the plank 15. The rear wall 18 of the frame 15 is cut away or provided with recesses as at 29 for receiving the rear edge of the plank 15.

Extending between the third portions 26 of the body members 22 is a horizontally disposed platform 30, and a manually operable clamp member 31 is connected to the platform 30. The clamp member 31 is mounted for movement into and out of locking engagement with the base 32 of the saw 10. A flange 33 extends upwardly from the front of the platform 30, and the flange 33 is adapted to engage the front edge of the saw base 32. The platform 30 is further provided with a pair of spaced parallel slots 34 and 35, Figure 2, so that the saw blades such as the saw blade 13 can be projected through either of the slots 34 and 35 as desired.

From the foregoing, it is apparent that there has been provided a jig for use with portable saws, such as the electric saw 10. The numeral 36 indicates the piece of wood or work being cut by the saw blade 13, and in use the plank 15 is adapted to be supported on support members such as the sawhorses 14. The plank 15 has its front edge engaged by the clamps 28 which are adapted to be adjusted by the screw members 27. The rear edge of the plank 15 fits into slots 29 in the rear of the frame 16 whereby the plank 15 and frame 16 are maintained connected together. The body members 22 are arranged so that the portions 23 slidably project through the openings 20 and bosses 21. The saw 10 is arranged so that the base 32 is clamped onto the platform 30 through the medium of a manually operable clamp member 31, and also the flange 33 engages the front of the saw base 32 whereby the saw 10 is maintained connected to the platform 30 and hence to the body members 22. Then, in use with the work piece 36 supported on the plank 15, it will be seen that the user or operator merely grips the handle 12, and then moves the saw 10, and as the saw 10 moves, the platform 30 moves and this causes movement of the pair of body members 22 with respect to the frame 16. Since the portion 23 of the body members 22 extend through the openings 20 and through the bosses 21, it will be seen that the saw 10 will move in a straight line so that square cuts in the work 36 can be readily made. Due to the pair of slots 34 and 35, it will be seen that the setup can be used whether the blade 13 is on the right or left hand side of the apparatus.

The saw 10 is releasably connected to the platform 30 through the medium of the clamp 31 so that when the saw 10 is to be removed, the clamp 31 can be readily unlocked whereby the saw 10 can be removed from the jig. Furthermore, the jig is constructed so that the various parts can be disassembled as for example, when it is not needed whereby the parts will occupy a minimum amount of space for storage or shipment.

The setup of the present invention is adapted to be used with portable saws and can be used for different types of power saws as desired. The parts can be made of any suitable material and in different shapes or sizes. The eccentric clamp 31 is preferably detachable so that it can be readily moved to different holes placed in the platform 30 to accommodate the difference in base plate length of the various power saws on the market since the jig should be easily adaptable to all power saws and hence is of increased value to the contractor or carpenter or other user. The present invention thus constitutes a mounting for an electric hand saw, and the body members 22 are slidably connected to the box frame 16 as previously described, the body member supporting the motor which is used for cutting the wood. The clamps 28 can be adjusted as desired, and due to the provision of the pair of slots 34 and 35, the apparatus can be used with either a left or right hand blade.

The portable electric hand saw 10 is attached to the platform 30 by means of the eccentric clamp or arm 31 and the edge or flange 33 holds the saw base 32 firmly in place and the saw can be easily attached or detached as desired. The body member may be made of a steel rod, and the bosses 21 may be provided with bronze shim. The plank 15 and frame 16 are held connected together by means of the clamps 27 and the slots 29. The slots 34 and 35 are of a size and arrangement so as to accommodate either a left or right hand saw. The stop members 24 on the ends of the portions 23 prevent the body members 22 from being pulled all the way out of the frame 16.

With the portable saw jig of the present invention, any type of electric hand saw may be used and the advantages of this saw jig over conventional radial arm saws is as follows. Any 8 inch or larger electric hand saw can be used, and the jig is lightweight and can be easily carried by one person. It can be readily attached to an 8 inch, 10 inch or 12 inch plank and the plank is held by the two sawhorses 14. It is of the open throat type so that it can be fed without shoving the lumber to be cut, under an over-head arm and this makes the cutting of lengths up to sixteen feet in the center very easy. Also, the device is adapted to be used for square cutting framing lumber up to 2 inches in thickness and up to ten inches in width and it will also bevel cut lumber, providing the saw used is so equipped.

Another important feature of the saw arrangement is the safety factor. In order to cut, the saw must be moved away from the operator and the saw blade is well shielded from the user whereas when using a conventional radial arm saw, the saw is moved towards the operator and is unguarded making it very hazardous to use.

The jig of the present invention is especially suitable for use by carpenters and small scale contractors who cannot afford to invest in a radial arm saw or who find them too cumbersome to move from job to job and too large to use inside the house where this type of saw would be most useful. It has been found that only a very small percent of house framing need be angle cut and that which does, such as rafters, can best be done freehand, so that no provision has been made for the same in the present invention.

It is further noted that portable electric hand saws such as the heavy duty type, because of the heaviness thereof, are avoided or shunned by most carpenters on the job and many contractors have such saws lying idle. With the jig of the present invention, the last named saw could be put back into paying service since the heftiness would not prevent its being used. The attachment of the present invention is especially suitable in the building industry and it can be produced cheaply and with less cost than a radial saw arm attachment.

The above description of the invention is for illustrative purposes only and it is understood that modifications may be made in the construction within the scope and spirit of the following claims.

I claim:

1. In an inverted radial saw jig for use with a portable electric hand saw of the type including a base, said jig including support members arranged in spaced apart relation with respect to each other, a horizontally disposed plank extending between said support members and supported thereby, a rectangular frame including vertically disposed front, back and side walls, there being registering openings in said front and back walls, bosses arranged adjacent said openings and extending from said front and back walls, a pair of movable body members including horizontally disposed first portions slidably mounted in said openings and bosses, vertically disposed second portions extending upwardly from an end of said first portions and said second portions terminating in horizontally disposed third portions, said third portions being shorter than said first portions, said rear wall being provided with cut away portions for receiving the rear end of the plank, screw members adjustably mounted in said front wall, clamps connected to said screw members for engagement with the front edge of the plank, a horizontally disposed platform extending between the third portions of said body members and said platform being provided with a pair of spaced parallel slots, a manually operable clamp member for releasably connecting the rear portion of the base of the saw to said platform, and a flange extending upwardly from the front of said platform for engagement with the front portion of said base.

2. In an inverted radial saw jig for use with a portable electric hand saw of the type including a base, said jig including support members arranged in spaced apart relation with respect to each other, a horizontally disposed plank extending between said support members and supported thereby, a rectangular frame including vertically disposed front, back and side walls, there being registering openings in said front and back walls, guide means arranged adjacent said openings and extending from said front and back walls, a pair of movable body members including horizontally disposed first portions slidably mounted in said openings and guide means, vertically disposed second portions extending upwardly from an end of said first portions and said second portions terminating in horizontally disposed third portions, said third portions being shorter than said first portions, said rear wall being provided with cut away portions for receiving the rear end of the plank, screw members adjustably mounted in said front wall, clamps connected to said screw members for engagement with the front edge of the plank, a horizontally disposed platform extending between the third portions of said body member and said platform being provided with a pair of spaced parallel slots, a manually operable clamp member for releasably connecting the rear portion of the base of the saw to said platform, a flange extending upwardly from the front of said platform for engagement with the front portion of said base, and stop members secured to the ends of the first portions of said body members.

3. In an inverted radial saw jig, support members, a plank extending between said support members, a frame connected to said plank, body members slidably connected to said frame for transverse movement in relation to said frame and said plank, a platform having a pair of spaced parallel slots extending transversely thereof connected to said body members, a manually operable clamp member for detachably connecting the rear portion of a base of a rotary electric saw to said platform for projection of the saw blade of said saw through said slots, screw members adjustably connected to said frame and having clamps thereon for engagement with said plank, and means for detachably connecting the front portion of the base of the saw to said platform, said last named means including a flange on the front of said platform, said platform being movable transversely of said plank to cut work positioned on said plank and stop members on said body members to limit movement of said body members in one direction.

References Cited in the file of this patent
UNITED STATES PATENTS

| | | |
|---|---|---|
| 1,646,589 | Meek et al. | Oct. 25, 1927 |
| 1,767,012 | Pfau | June 24, 1930 |
| 1,846,641 | Hedgpeth | Feb. 23, 1932 |
| 2,589,554 | Killian | Mar. 18, 1952 |
| 2,651,333 | Spinney | Sept. 8, 1953 |